(12) United States Patent
Swerdlow

(10) Patent No.: US 11,792,032 B2
(45) Date of Patent: Oct. 17, 2023

(54) CONTENT REPLAY FOR CONFERENCE PARTICIPANTS

(71) Applicant: Zoom Video Communications, Inc., San Jose, CA (US)

(72) Inventor: Nick Swerdlow, Santa Clara, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/513,422

(22) Filed: Oct. 28, 2021

(65) Prior Publication Data

US 2023/0132639 A1 May 4, 2023

(51) Int. Cl.
*H04L 12/18* (2006.01)
*G06N 20/00* (2019.01)

(52) U.S. Cl.
CPC ......... *H04L 12/1831* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,343,313 B1 * | 1/2002 | Salesky | H04L 12/1822 715/752 |
| 7,945,619 B1 | 5/2011 | Chawla et al. | |
| 8,395,656 B1 | 3/2013 | Malzbender et al. | |
| 8,750,472 B2 | 6/2014 | Shun et al. | |
| 9,363,093 B2 | 6/2016 | Givental et al. | |
| 9,955,116 B2 | 4/2018 | Givental et al. | |
| 9,977,574 B2 | 5/2018 | Quinn et al. | |
| 10,453,355 B2 | 10/2019 | Ashbrook | |
| 10,798,341 B1 * | 10/2020 | Hegde | H04N 21/8549 |
| 11,381,412 B1 | 7/2022 | Chau | |
| 2003/0128987 A1 * | 7/2003 | Mayer | H04Q 11/0062 398/52 |
| 2004/0042103 A1 * | 3/2004 | Mayer | G11B 31/003 386/314 |
| 2008/0062250 A1 * | 3/2008 | Rye | H04N 5/23299 348/E7.001 |
| 2009/0003560 A1 * | 1/2009 | Katis | H04N 7/15 379/93.01 |
| 2011/0153768 A1 | 6/2011 | Carter et al. | |

(Continued)

*Primary Examiner* — Scott B Christensen
(74) *Attorney, Agent, or Firm* — Young Basile Hanlon & MacFarlane, P.C.

(57) ABSTRACT

A conference participant is provided replay content during a conference responsive to the conference participant needing content and/or context of current conversations. During the conference, a replay request is received, which may be initiated by the conference participant or other participants or automated my software, such as based on an event detected using a real-time transcription of the conference. For example, the event may relate to a topic relevant to the conference participant or a request associated with a name of the conference participant. Content is obtained from a buffer for a period of time relative to or associated with the replay request. The content is annotated based on one or more annotation inputs. Device and user settings associated with the conference participant are used to determine a presentation mode for the replay content. Based on that determination, the replay content is presented to the conference participant to guide discussions.

20 Claims, 8 Drawing Sheets

(56) References Cited

U.S. PATENT DOCUMENTS

| | | | |
|---|---|---|---|
| 2011/0196930 A1 | 8/2011 | Chawla et al. | |
| 2011/0267419 A1* | 11/2011 | Quinn | G06V 10/464 |
| | | | 348/E7.083 |
| 2013/0290434 A1 | 10/2013 | Bank et al. | |
| 2014/0063174 A1* | 3/2014 | Junuzovic | G06Q 10/101 |
| | | | 348/E7.083 |
| 2014/0186010 A1* | 7/2014 | Guckenberger | G11B 27/11 |
| | | | 386/248 |
| 2015/0012270 A1* | 1/2015 | Reynolds | H04L 65/403 |
| | | | 704/233 |
| 2016/0073054 A1 | 3/2016 | Balasaygun et al. | |
| 2016/0234268 A1* | 8/2016 | Ouyang | H04L 67/54 |
| 2016/0323333 A1* | 11/2016 | Aggarwal | H04L 65/4038 |
| 2016/0344779 A1 | 11/2016 | Jain et al. | |
| 2017/0282079 A1* | 10/2017 | De La Cruz | A63F 13/67 |
| 2020/0153647 A1 | 5/2020 | Jouhikainen et al. | |
| 2020/0153915 A1 | 5/2020 | Jain et al. | |
| 2020/0403817 A1 | 12/2020 | Daredia et al. | |
| 2021/0397402 A1* | 12/2021 | Ashkenazi | G09G 5/14 |
| 2022/0078038 A1* | 3/2022 | Dandapani | H04L 12/1831 |

\* cited by examiner

CONTENT REPLAY FOR CONFERENCE PARTICIPANTS

FIELD

This disclosure relates to communication services. More specifically, this disclosure relates to providing content replay services for participants in a conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
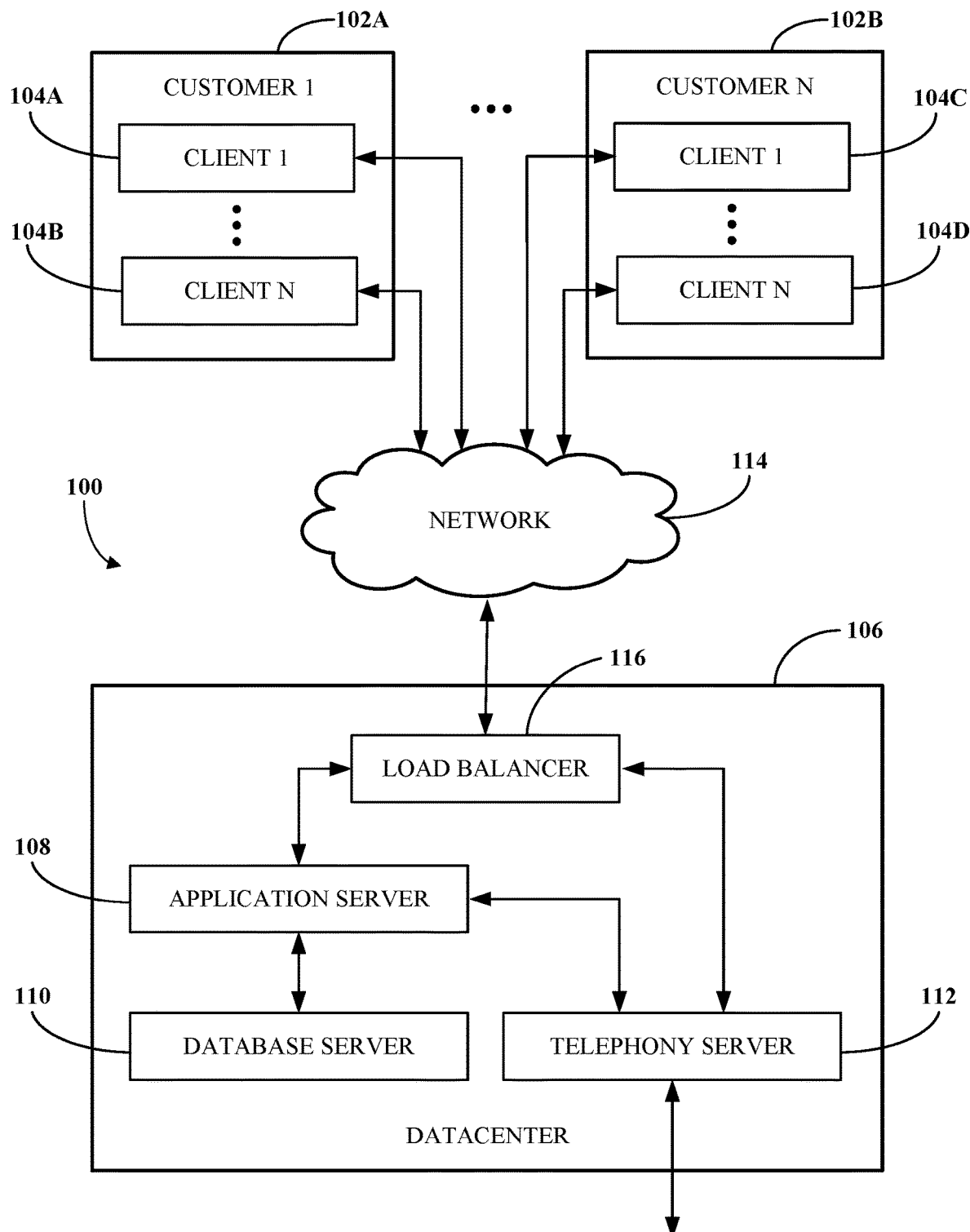
FIG. 1 is a block diagram of an example of an electronic computing and communications system.

During video conferences or conferences, there are usually multiple participants and multiple topics involved in a discussion. A conference participant may be asked for an opinion on a topic or for other relevant input. However, the conference participant may be distracted at that moment or not comprehend the question or context of the question. In some cases, the participant may admit he/she wasn't paying attention by asking "can you repeat the question?" In other cases, the participant may embarrass himself/herself by giving a useless non-answer, hoping his/her transgressions will go unnoticed.

A conference participant may have any number of reasons for not knowing the context of a current topic. These reasons may include, for example, sidebar conversations, misunderstanding the question, external distractions, or a wandering mind. For example, a conference participant may get an incoming message or alert unrelated to the conference which distracts him or her from the current conversation. In another example, a conference participant may believe that the current conversation is not relevant and decide to use the time to focus on a different task while remaining in the conference. In another example, the topic at hand may shift at any moment from one with which the conference participant is not involved or familiar to one with which he or she is.

Furthermore, a conference participant attending a conference implemented over software may be away from the device he or she is using to access the conference or may have their audio output muted such that he or she does not notice when a topic shift occurs or when his or her name is being spoken. In many cases, if a topic shift as described above happens or if his or her name is spoken, the conference participant may not know about it until after the conversation has changed. Such participants may therefore appear to be distracted to others (and incur needless negative perception) when they were actually engaged in a different aspect of the conference.

Conventional conferencing software services do not have mechanisms for providing a participant with a recall or replay of content and context prior to a triggering event. As such, when a participant is asked for an opinion on a topic or for other relevant input, conventional conferencing software services do not provide a way for the participant to quickly understand the context and respond intelligently.

Implementations of this disclosure address problems such as these using content replay services, for example, for distracted or uncomprehending conference participants. A conference participant is provided with replay content associated with the conference participant during a conference responsive to a replay request. For example, the replay request may be initiated by the conference participant, by another participant, or by the conferencing software itself automatically upon detection of an event determined to be related to the conference participant. The event, for example, may be or refer to a conference participant name or a topic associated with the conference participant being spoken or discussed during the conference. Based on receiving the replay request, the replay content is generated from a period of time relative to or associated with the replay request. The period of time can be a defined period of time or a configurable period of time. For example, the participant or other individual can set or select the period of time. For example, the replay content may include a transcription of audio content, playback of audio content, playback of video, annotated transcription, a summary of an audio transcription, annotated summary, annotated video playback, subject to the determined format or formats for the replay content. In some instances, generation of the replay content can include annotating the content based on different annotation inputs. For example, the annotation inputs can include information from a chat communication service, instant messaging service, email service, and other communication services. The replay content is presented, such as within a user interface of a client application through which the conference participant connects to the subject conference, to guide participation by the conference participant in the conference.

To describe some implementations in greater detail, reference is first made to examples of hardware and software structures used to implement a system for content replay for conference participants. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as a unified communications as a service (UCaaS) platform. Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a UCaaS platform, which includes several communications services integrated over a network, such as the Internet, to deliver a complete communication experience regardless of physical location.

Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
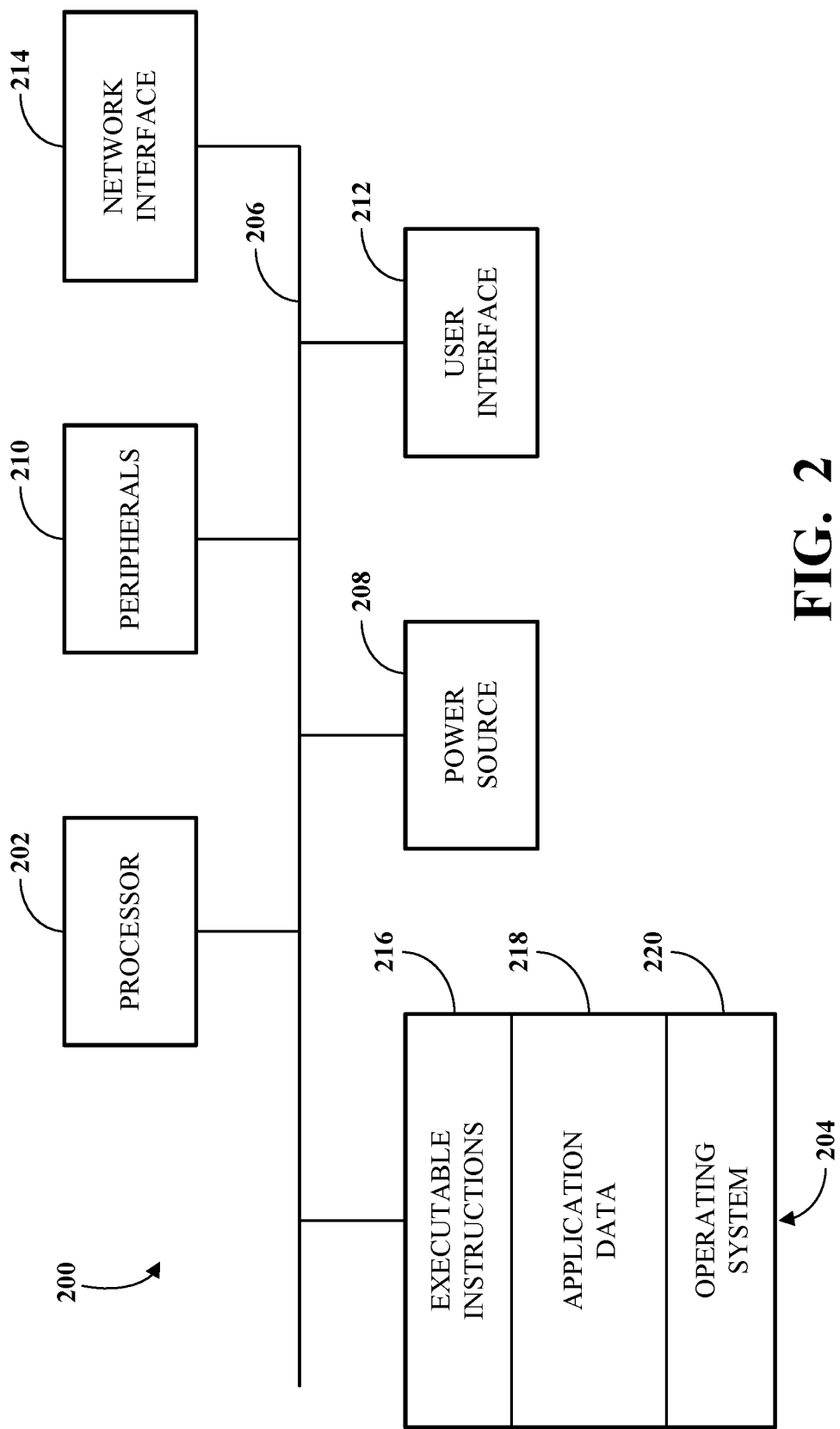
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
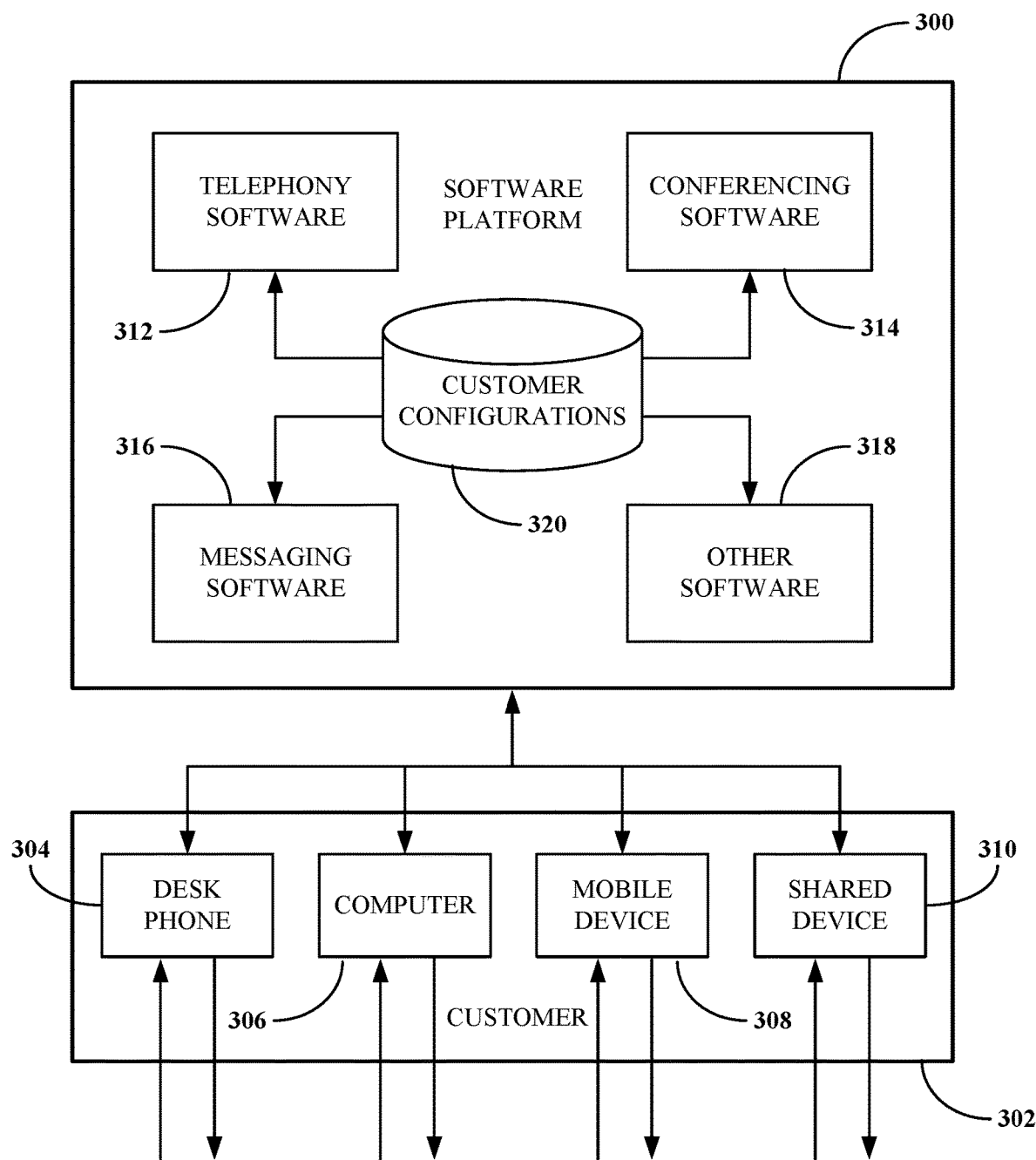
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format. The other software 318 enables other functionality of the software platform 300. Examples of the other software 318 include, but are not limited to, device management software, resource provisioning and deployment software, administrative software, third party integration software, and the like. In one particular example, the other software 318 can include content replay software for receiving a replay request for a participant in a video conference, generating replay content based on content present in a period of time relative to or associated with the replay request, and presenting the replay content to guide participation by the participant in the video conference.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
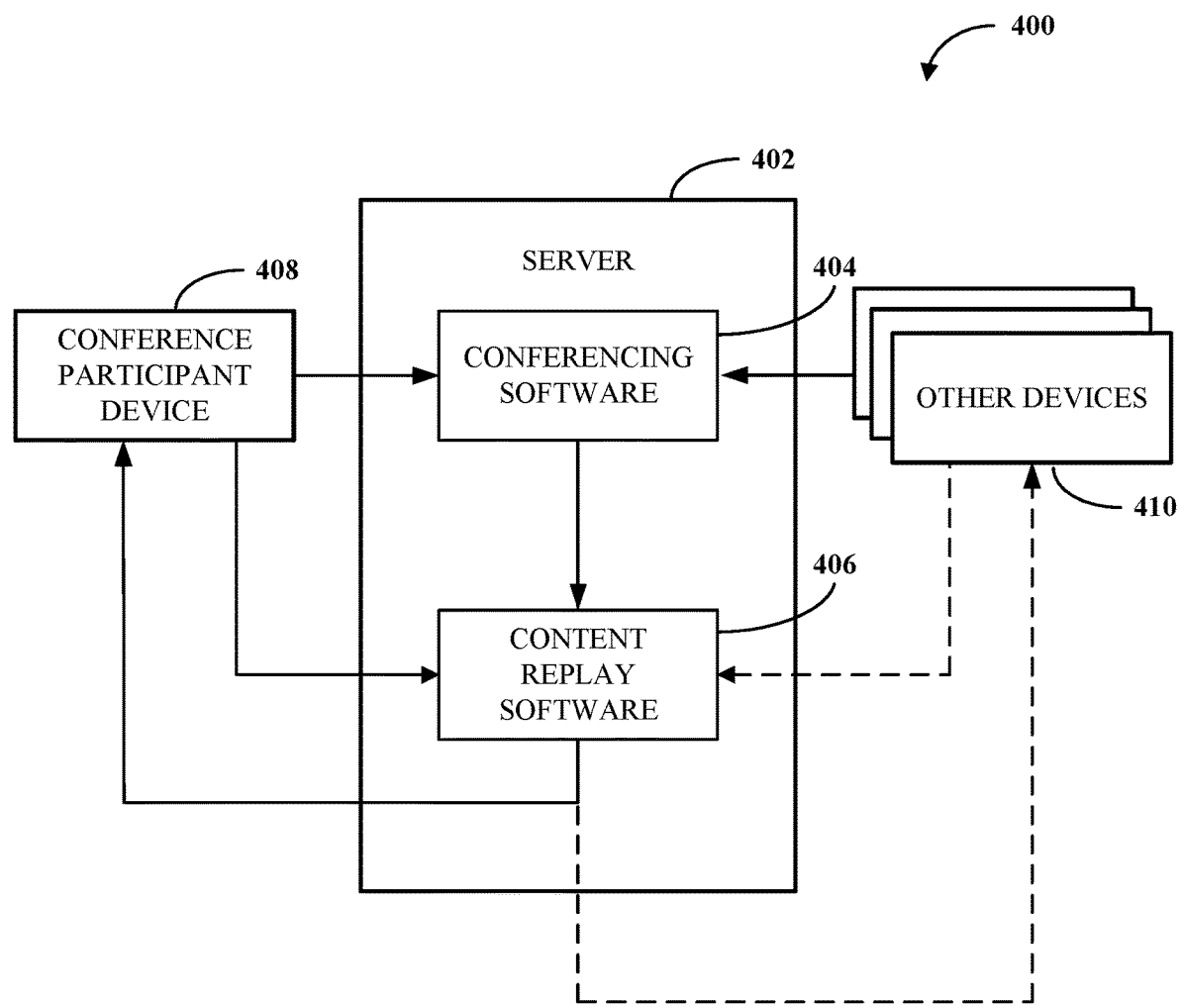
FIG. 4 is a block diagram of an example of a system for content replay.

FIG. 4 is a block diagram of an example of a system 400 for content replay for conference participants. The system 400 includes a server 402 which runs conferencing software 404 and content replay software 406. The conferencing software 404 implements a conference between operators of multiple devices and may, for example, be the conferencing software 314 shown in FIG. 3. As shown, the conferencing software 404 implements a conference between an operator of a conference participant device 408 and operators of one or more other devices 410. In an example, the one or more other devices 410 may be other conference participant devices. Each of the conference participant device 408 and the other devices 410 may be a client device such as one of the clients 304 through 310 shown in FIG. 3 or a non-client device which accesses the conferencing software 404 other than by using a client application.

The content replay software 406 provides conference participants, such as the operator of a conference participant device 408 and the operators of one or more other devices 410, a content replay enable button on a user interface such as the user interface 212 shown in FIG. 2 to consent to the conferencing being recorded so that the system can use the conference data to generate the replay content.

The content replay software 406 interfaces with the conferencing software 404 to replay content based on replay requests received during a conference implemented by the conferencing software 404. The replay request is a manually selected or automatically determined input to trigger processing associated with presenting replay content as described herein. The content replay software 406 may receive replay requests initiated by the operator of the conference participant device 408, receive replay requests initiated by the operators of the other devices 410, or receive replay requests based on detection of an event associated with a conference participant. In the latter case, receiving a replay request based on the detection of an event associated with a conference participant can include the content replay software 406 initiating the replay request based on the detection. For example, the operator of the conference participant device 408 or the operators of the other devices 410 may use a replay control button on a user interface such as the user interface 212 shown in FIG. 2 to send a replay request to the content replay software 406. In another example, the content replay software 406 monitors a conversation between participants of the conference implemented by the conferencing software 404, such as using a real-time transcription of the conference, to detect an event associated with a conference participant. Based on the replay request, the content replay software 406 can generate the replay content. The replay content is generated based on content from the conference which is from a defined period of time relative to or associated with the replay request. This content may be maintained in a buffer using a moving window mechanism based on the period of time. For example, the period of time may be approximately 10-15 seconds and the buffer may be implemented as one or more memory components within the memory 204 shown in FIG. 2. The generation of the replay content can include annotating the content based on the one or more annotation inputs such as the chat communication service, instant messaging service, email service, and other communication services.

The content replay software 406 can present the replay content to the participant(s) to guide participation by the participant(s) in the video conference. Presenting the replay content to a participant includes outputting the replay content or data indicative thereof within a user interface of a client application running on a device of the participant, for example, the conference participant device 408, the operators of the other devices 410, or combinations thereof. In an example, the presentation of the replay content is imperceptible to other participants in the video conference. The content replay software 406, for example, may be the content replay software referred to above with respect to the other software 318 shown in FIG. 3. In some implementations, the conferencing software 404 may include the content replay software 406. In some implementations, the conferencing software 404 and the content replay software 406 may wholly or partially run on different servers.

In some implementations, a conference participant device which is connected to the conferencing software 404 may also communicate directly with the content replay software 406. For example, the content replay software 406 may receive data from and transmit data to the conference participant device 408, the other devices 410, or combinations thereof. The data received at the content replay software 406 from the conference participant device 408 or other devices 410 can include the replay request, information usable to annotate the content, device configuration information, or combinations thereof. The data transmitted from the content replay software 406 to the conference participant device 408 or other devices 410 can include the replay content, instructions for optimizing location of a replay content window based on the device configuration information, a replay presentation mode based on the device configuration information, or combinations thereof. For example, the device configuration information can include a presence of headphones, a shared window mode, a display mode, or combinations thereof.

In some implementations, the content replay software 406 may be implemented at each of the participant devices (e.g., separately at each of the conference participant device 408 and the other devices 410) which are connected to the conferencing software 404, for example, through client applications running on those participant devices. For example, each of the participant devices can replay content as described herein independently of other participant devices connected to the conferencing software 404. In another example, certain of the participant devices can share replay content based on configuration settings or by linking the content replay software 406 via the conferencing software 404.

Figure 5:
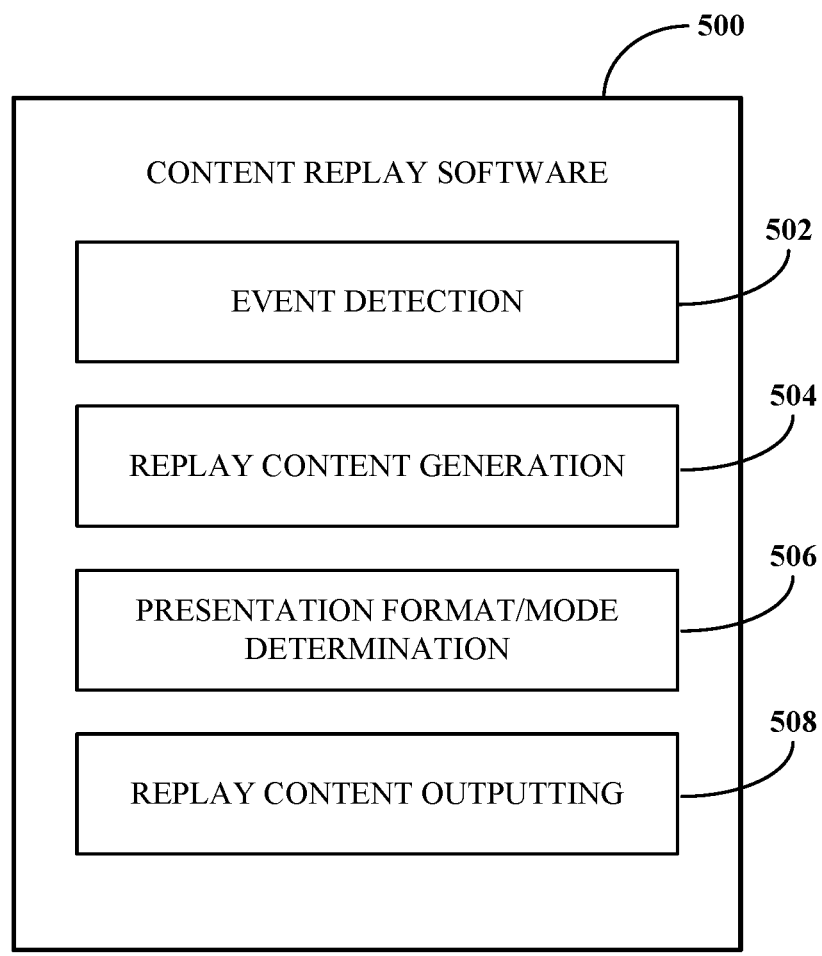
FIG. 5 is a block diagram of example functionality of content replay software.

FIG. 5 is a block diagram of example functionality of content replay software 500, which may, for example, be the content replay software 406 shown in FIG. 4. The content replay software 500 includes tools, such as programs, subprograms, functions, routines, subroutines, operations, and/or the like for receiving a replay request for a participant in a conference (e.g., a video conference, Internet based conference, webinar, teleconference, web conferencing, or online conference), generating replay content based on content present in a defined window of time relative to or associated with the replay request, and presenting the replay content to the participant during the conference. As shown, the content replay software 500 includes an event detection tool 502, a content replay generation tool 504, a presentation format or mode determination tool 506, and a replay content outputting tool 508.

The event detection tool 502 detects an event associated with a conference participant during a conference based on a real-time transcription of the conference. The event thus is or refers to conversational content within the conference. For example, an event detectable using the event detection tool 502 may be or refer to a request naming the conference participant or a discussion of a topic relevant to the conference participant. The event detection tool 502 may obtain and use the real-time transcription of the conference, which may be generated by the content replay software 500, the conferencing software, or other software, to detect the event. Alternatively, the event detection tool 502 may use output of a learning model trained for contextual content processing to detect the event. For example, the learning model, which may be a participant-contextual machine learning model, may evaluate content of the real-time transcription to produce output. The output may, for example, identify a topic relevant to the conference participant or a request associated with a name of the conference participant. For example, the topic may be related to a meeting title, meeting agenda, subject matter associated with an agenda, product names, colleague names, project names, or participant characteristics. In another example, the event detection tool 502 may detect that the conference participant is being inattentive to the conference. For example, images and audio obtained of the conference participant and/or device settings of the conference participant device can be used to determine that the conference participant is not present at the conference participant device, is facing away from a display of the conference participant device, has speakers turned off, and/or is talking on another device. Upon detection of the event, the event detection tool 502 sends or initiates a replay request by the content replay software 500 or the content replay generation tool 504.

The content replay generation tool 504 generates replay content based on receipt of a replay request. The replay content is generated from content captured from a media stream received from one or more other participant devices connected to the conference (e.g., directly from those participant devices or from within a buffer) which is a defined or configurable period of time relative to or associated with the replay request. For example, the participant can program, configure, or select the period of time. The content replay generation tool 504 can annotate the content to provide guidance to the participant so that a response by the participant is appropriate for the circumstances or context. The replay content may be presented as a prompt (e.g., a push notification within a client application, text added to a private chat window accessible only to the subject conference participant, or another notification presented to the conference participant external to the client application) to the participant.

In one example, the content replay generation tool 504 can annotate the content by highlighting keywords in the content. The keywords are words or phrases within the replay content that are likely to be most relevant to a subject conversation associated with the replay content. For example, keywords to highlight can be selected based on meeting title, meeting agenda, subject matter associated with an agenda, product names, colleague names, project names, or participant characteristics. The content replay generation tool 504 may use the output of a participant-contextual machine learning model to highlight the keywords.

In another example, the content replay generation tool 504 can annotate the content based on information or messages present in a chat window. During the conference, a conference participant can be exchanging chat messages with other participants, team members, users to whom a participant has assigned or delegated certain rights, or combinations thereof. In one example, the content replay generation tool 504 can annotate the content by adding keywords from the information. In another example, the content replay generation tool 504 can highlight the content based on the information. In yet another example, the content replay generation tool 504 can include a summary of the information along with the content.

In yet another example, the content replay generation tool 504 can annotate the content based on information or messages present in messaging platforms. During the conference, a conference participant can be exchanging messages with other participants, team members, users to whom a participant has assigned or delegated certain rights, or combinations thereof. In one example, the content replay generation tool 504 can annotate the content by adding keywords from the information. In another example, the content replay generation tool 504 can highlight the content based on the information. In yet another example, the content replay generation tool 504 can include a summary of the information along with the content.

In yet another example, the content replay generation tool 504 can annotate the content based on information or messages received from other participants, team members, users to whom a participant has assigned or delegated certain rights, or combinations thereof. In one example, the content replay generation tool 504 can annotate the content by adding keywords from the information. This information may be received by the content replay software 500 via the communication services or dedicated content replay software channels. In another example, the content replay generation tool 504 can highlight the content based on the information. In yet another example, the content replay generation tool 504 can include a summary of the information along with the content.

In still a further example, the content replay generation tool 504 can summarize the content or a portion thereof. For example, the summary can be based on keywords selected based on meeting title, meeting agenda, subject matter associated with an agenda, product names, colleague names, project names, participant characteristics, or combinations thereof. The content replay generation tool 504 may use the output of a participant-contextual machine learning model to determine the keywords.

The content replay generation tool 504 can store the replay content, inputs related to annotation of content, and outputs separate from a recording of the conference. The storing, for example, can be implemented using one or more memory components of the memory 204. For example, this can be done by tagging the replay content, inputs, and outputs accordingly. Other mechanisms can be used. This can preserve confidentiality, security, and/or privacy of the replay content, inputs, and outputs.

The presentation format determination tool 504 determines a format in which to present the replay content to the participant(s). The replay content can be presented to the participant in one or more of multiple possible formats. For example, the replay content can be presented in an audio format, video format, text format, image format, other visual format, or combinations thereof. The format can be determined based on device configuration data from participant devices such as the conference participant device 408 or the other devices 410. The device configuration data can include, for example, audio output settings and display settings. The device configuration data can be used to determine which formats are available for presentation of the replay content.

In one example, the presentation format determination tool 504 determines from audio output settings whether headphones or speakers are being used as output devices to listen to audio from the conference. Upon a determination that the participant is using headphones, the presentation format determination tool 504 can select headphones presentation type. For this selection, the replay content is channeled into the headphones of the participant. For example, text-to-speech software can be used to convert the replay content to an audio format for playing on an audio device. Upon a determination that the participant is using speakers, the presentation format determination tool 504 can select speakers presentation type. For this selection, the replay audio stream is filtered out from a microphone input stream to prevent feedback and/or be imperceptible to others. In this example, the replay content is presented through the speakers. The presented replay content will be picked up by a microphone located at the participant. However, since the replay audio stream is known, the replay audio stream can be filtered out from the input stream detected at the microphone during audio processing. Alternatively, a microphone associated with the participant device is muted to prevent feedback or be imperceptible to others. The replay content is then output via the speakers. The muted microphone is unmuted after presentation of the replay content.

In another example, the presentation format determination tool 504 determines from display output settings whether a display is enabled and if so, what arrangement of user interface views within the conferencing software is currently in use at the conference participant device 408 or the other devices 410. For example, the arrangements can include a gallery view arrangement, an active speaker view arrangement, a floating thumbnail view arrangement, or a customized view arrangement. Each view arrangement can have optimum locations for opening a replay content window in which a visual representation of the replay content is presented. For example, visual representations of the replay content can include a transcription of the audio, annotated transcriptions, summaries, annotated summaries, or a video recording, as described herein, subject to the determined format or formats for the replay content. For example, in the gallery view arrangement, the presentation format determination tool 504 can treat the replay content window as a tile for placement on a top panel. In another example, in the active speaker view arrangement, the presentation format determination tool 504 can treat the replay content window as a tile for placement on a top panel. In yet another example, in the floating thumbnail view arrangement, the presentation format determination tool 504 can position the replay content window as a top tile on the floating thumbnail panel.

In yet another example, the presentation format determination tool 504 can generate an alert on a control bar of a determined view arrangement to indicate to the participant an upcoming or available replay content. For example, this can alert the participant that a replay content is coming or enable the participant to play the replay content in case he or she missed it or needs to listen or view the replay content again.

During a conference, a participant can share a screen with other participants to illustrate a point or discuss language, for example. This may impact whether presentation of the replay content will be imperceptible with respect to the other participants. In certain cases, the participant may want to maintain imperceptibility of the replay content presentation, while in other cases the participant may want to share the replay content presentation. For example, this may be implemented by providing a share button on a user interface such as the user interface 212 shown in FIG. 2 to share a presentation of the replay content. The presentation format determination tool 504 can determine whether the view arrangement includes a shared screen. Upon determination of a shared screen situation and absent selection of the share button, the presentation format determination tool 504 can generate the replay content window in a non-shared screen. Thus, the replay content window is maintained as imperceptible to other participants. For example, the device configuration data can include data indicating that a share button state. Upon determination of a shared screen and selection of the share button, the presentation format determination tool 504 can generate the replay content window in the shared screen. Thus, in this example, the replay content window is available to other participants such as in a classroom setting. For example, the device configuration data can include data indicating that a user has selected the share button.

The replay content outputting tool 508 causes a presentation of the replay content to the participant(s) in accordance with the format determined by the presentation format determination tool 504. Generally, the replay content outputting tool 508 outputs the data of the replay content along with instructions, commands, or other information configured to cause the device of the participant(s) to output the replay content to the participant(s). However, in some cases, the replay content outputting tool 508 outputs those instructions, commands, or other information to a secondary device associated with the participant(s). For example, if a classroom mode setting is enabled, the presentation of the replay content can be on secondary device such as on a large screen display in a hybrid online classroom setting. Thus, a speaker may make a comment about a previous example discussed during the conference and participants can use the content replay system to obtain a previous example with annotations related to a current context. In this example, the speaker can be using another device at a lectern for conference presentation.

Although the tools 502 through 508 are shown as functionality of the content replay software 500 as a single piece of software, in some implementations, some or all of the tools 502 through 508 may exist outside of the content replay software 500 and/or the software platform may exclude the content replay software 500 while still including the some or all of tools 502 through 508 in some form elsewhere.

Figure 6:
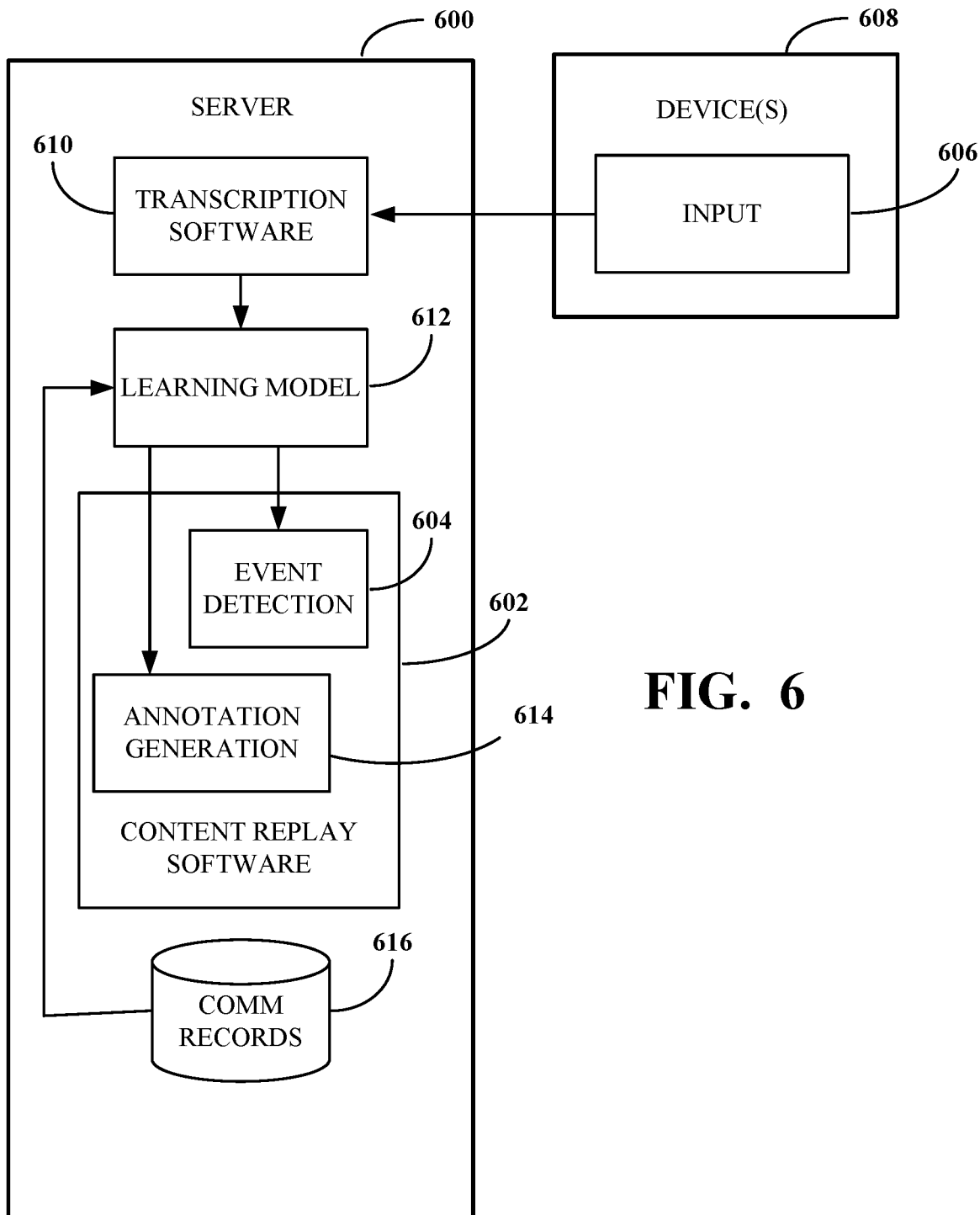
FIG. 6 is a block diagram of an example of an event detection-based replay request based on input received from devices connected to a conference.

FIG. 6 is a block diagram of an example of an event detection-based replay request, where the event detection is based on input received from devices connected to a conference. As shown, a server 600 runs content replay software 602 which includes an event detection tool 604. The event detection tool 604 detects an event associated with a conference participant during a conference based on input 606 received from one or more devices 608 connected to the conference. For example, the server 600, the content replay software 602, and the one or more devices 608 may respectively be the server 402, the content replay software 406, and the one or more other devices 410 shown in FIG. 4. In another example, the event detection tool 604 may be the event detection tool 502 shown in FIG. 5.

In particular, the one or more devices 608 include or otherwise refer to devices such as a conference participant device (e.g., the conference participant device 408 shown in FIG. 4) of a conference participant with whom the event detected by the event detection tool 604 is associated and to other devices (e.g., the other devices 410 shown in FIG. 4). As such, the input 606 received from the one or more devices 608 is received from all devices in the conference. For example, the input 606 could be a question to a conference participant, topics related to the conference participant, a request for clarification by the conference participant, conference participant initiated replay request, and/or another participant initiated replay request. The input 606 includes audio information captured over one or more audio channels between the devices 608 and conferencing software which implements the conference (e.g., the conferencing software 404 shown in FIG. 4), video information captured over one or more video channels between the devices 608 and conferencing software which implements the conference, and replay request data sent to the conferencing software and/or the content replay software 602.

The audio information of the input 606 is processed using transcription software 610 to generate a real-time transcription of the conference. In particular, the real-time transcription is generated in real-time concurrently with the conference based on real-time conversations occurring within the conference. Thus, in at least some cases, the real-time transcription may not be considered fully generated until after a final conversation during the conference has been completed. Accordingly, generating the real-time transcription may include or otherwise refer to generating a portion of the real-time transcription corresponding to a current conversation occurring at a given time during the conference. The transcription software 610 may, for example, be or refer to an automated speech recognition engine configured to access the conference.

The real-time transcription generated by the transcription software 610 is next processed using a learning model 612 to determine whether content of the real-time transcription relates to an event associated with a conference participant of the conference. The learning model 612 may be or include a neural network (e.g., a convolutional neural network, recurrent neural network, or other neural network), decision tree, vector machine, Bayesian network, genetic algorithm, deep learning system separate from a neural network, or another machine learning model. The learning model 612 is trained to recognize content and context of conversations. For example, the learning model 612 may be a contextual learning model which is trained to evaluate the content of the real-time transcription generated by the transcription software 610, to identify a topic relevant to the conference participant and/or a request associated with a name of the conference participant as described herein.

In particular, to identify a request associated with a name of the conference participant, the learning model 612 evaluates instances of the name of the conference participant within the real-time transcription based on a context thereof to determine when such an instance is associated with a request. A request associated with the name of the conference participant may, for example, relate to another participant asking the conference participant by name for input on some topic, such as to comment on something or provide information based on some conversation at hand. An example of an instance of the name of the conference participant which may not relate to a request relates to an instance in which the name of the conference participant is spoken without some ask attached to it. For example, one participant saying the name of the conference participant in passing or while telling a story may not amount to an identification of a request associated with the name of the conference participant.

Separately, to identify a topic relevant to the conference participant, the learning model 612 evaluates keywords and/or related content within the real-time transcription against historical communication records 616 associated with the conference participant to determine when such keywords and/or related content correspond to a topic about which the conference participant has historically communicated. The historical communication records 616 may, for example, correspond to one or more of chat messages, instant messages, text messages, emails, call transcripts, conference agendas, or conference transcripts associated with the conference participant. For example, the learning model 612 may search through the historical communication records 616 based on certain keywords and/or related content within the real-time transcription. Responsive to an identical match or a contextual match based on that search, the learning model 612 may determine that the subject keywords and/or related content correspond to a topic which is relevant to the conference participant. For example, where one or more of the historical communication records 616 describe a project, a codename, a work order, an activity, a location, a team, or another aspect which has also been detected by the learning model 612 as having been brought up for discussion during the conference, such as based on a context and the content of the real-time transcription, the learning model 612 can identify that as a topic relevant to the conference participant.

The content replay software 602 also includes an annotation generation tool 614, which can be standalone or integrated in a replay content generation tool such as the replay content generation tool 504. The annotation generation tool 614 can annotate content which is associated with the detected event and/or a replay request. The annotation generation tool 614 can use the learning model 612 to evaluate keywords within the content using learned conference participant characteristics and against historical communication records 616 associated with the conference participant to determine when such keywords correspond to a topic about which the conference participant has historically communicated. The historical communication records 616 may, for example, correspond to one or more of chat messages, instant messages, text messages, emails, call transcripts, or conference transcripts associated with the conference participant. For example, the learning model 612 may search through the historical communication records 616 based on certain keywords within the content. Responsive to an identical match or a contextual match based on that search and/or based on the learned conference participant characteristics, the learning model 612 may determine that the subject keywords correspond to a topic which is relevant to the conference participant. For example, where one or more of the historical communication records 616 describe a project, a codename, a work order, an activity, a location, a team, or another aspect which has also been detected by the learning model 612 as having been brought up for discussion during the conference, such as based on a context and the content of the conference, the learning model 612 can annotate those keywords as a topic relevant to the conference participant, provide them as a snapshot of the conversation, provide them guidance as discussion points, provide them as pointers, provide them as prompts, and or combinations thereof.

In some implementations, one or both of the transcription software 610 or the learning model 612 may be included in the content replay software 602. In some implementations, the historical communication records 616 may be located other than on the server 600 on which the content replay software 602 is partially or wholly run. For example, the historical communication records 616 may be located on a participant device or a companion device.

Figure 7:
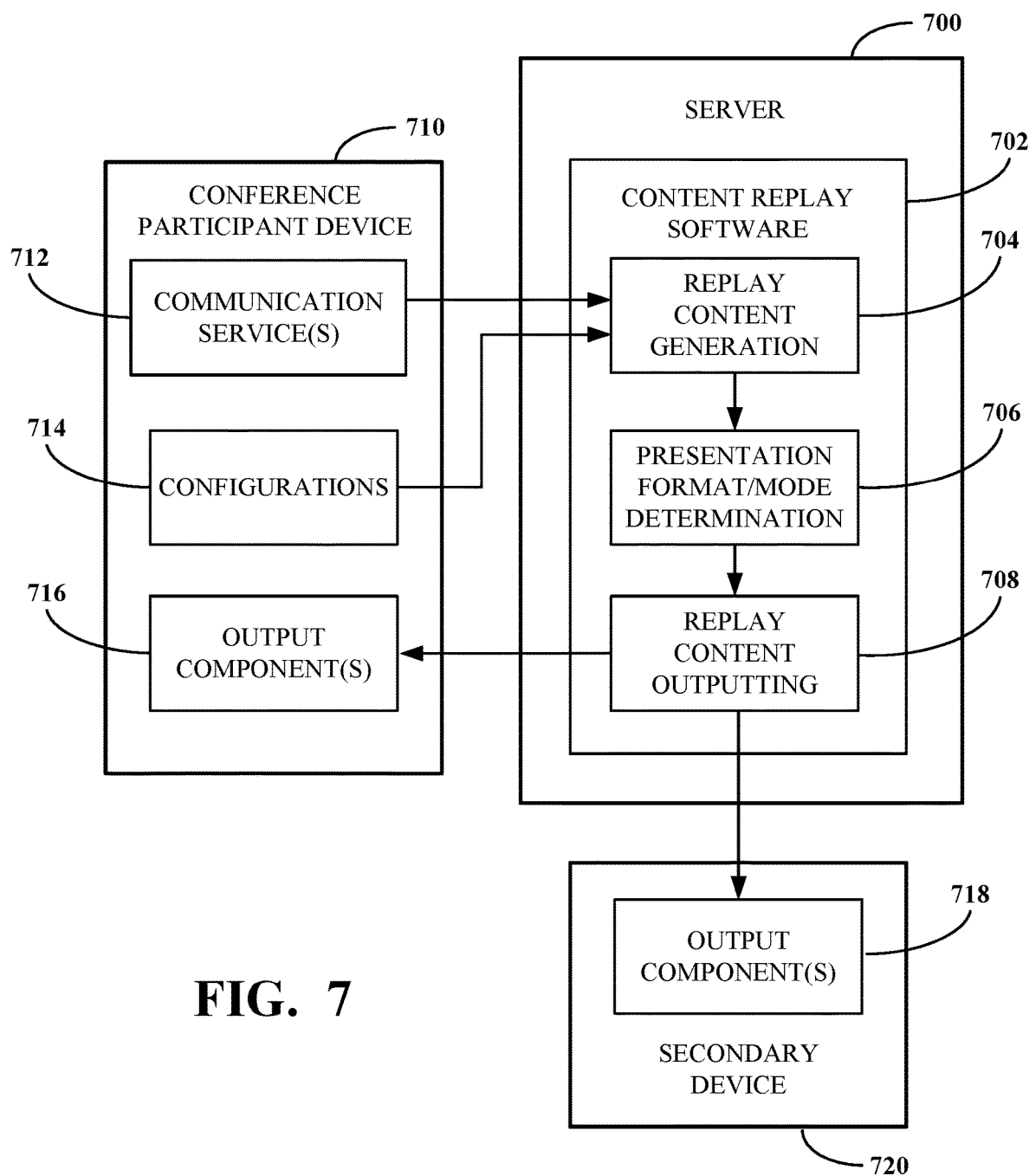
FIG. 7 is a block diagram of an example of replay content outputting in connection with receipt of a replay request during a conference.

FIG. 7 is a block diagram of an example of replay content output in connection with receipt of a replay request during a conference. As shown, a server 700 runs content replay software 702 which includes a replay content generation tool 704, a presentation format/mode determination tool 706, and a replay content outputting tool 708. The replay content generation tool 704 generates the replay content. The presentation format/mode determination tool 706 determines how, where, and to whom the replay content is presented. The replay content outputting tool 708 outputs the replay content based on the determined how, where, and to whom.

As an example, the server 700 may be the server 402 shown in FIG. 4 or the server 600 shown in FIG. 6, to the extent different. In another example, the content replay software 702 may be the content replay software 406 shown in FIG. 4 or the content replay software 602 shown in FIG. 6, to the extent different. In yet another example, the replay content generation tool 704, the presentation format/mode determination tool 706, and the replay content outputting tool 708 may respectively be the replay content generation tool 504, the presentation format/mode determination tool 506, and the replay content outputting tool 508 shown in FIG. 5.

In particular, the replay content generation tool 704 retrieves content which corresponds to a period of time relative to or associated with receipt of the replay request. The replay content generation tool 704 processes the content. The processing can include one or more of summarizing the content, annotating the content, and/or combinations thereof to generate the replay content. For example, the replay content generation tool 704 may use input received from one or more communications service(s) 712 running on the conference participant device 710 to annotate the content. The communications services 712 include or capture communications to and from the conference participant device 710 and other devices. These communications are used by the replay content generation tool 704 to highlight, guide discussion, and/or provide context with respect to the content.

The presentation format/mode determination tool 706 determines whether to use audio presentations of the replay content, video presentations of the replay content, and/or combinations thereof. The presentation format/mode determination tool 706 also determines whether the presentation is to be imperceptible to other participants or broadcast. For example, the presentation format/mode determination tool 706 can use one or more configurations 714 of the conference participant device 710 to make such determinations. The configurations 714 are or refer to settings of the conference participant device 710 and/or devices associated therewith. For example, the configurations may include a setting of an audio output device, such as headphones or speakers of or otherwise connected to the conference participant device 710, enablement of shared screens, view selection, usage mode, or combinations thereof.

The replay content outputting tool 708 then causes a presentation of output to the conference participant or others of the replay content according to the determinations made by the presentation format/mode determination tool 706. In particular, the replay content outputting tool 708 transmits instructions, commands, or other information configured to output the replay content to one or more output components 716 of the conference participant device 710 and/or other devices such as other devices 410 of FIG. 4. The output components 716 may, for example, include a display and/or an audio output device associated with the conference participant device 710 and/or other devices. In some implementations, the replay content outputting tool 708 may transmit instructions, commands, or other information configured to output the replay content to one or more output components 718 of a secondary device 720 associated with the conference participant. For example, the secondary device 720 may be another device through which the conference participant has accessed conferencing software used to implement the conference. In another example, the secondary device 720 may be another device registered to an account of the conference participant. In yet another example, the secondary device 720 may be another device detected on a same network to which the conference participant device 710 is connected. The output components 718 may, for example, include a display and/or an audio output device associated with the secondary device 720. The secondary device 720 may be a mobile device, such as a laptop, tablet, or mobile phone, augmented reality (AR) device, virtual reality (VR) device, or it may be a wearable device, such as a network-connected wristband, ring, or watch.

Figure 8:
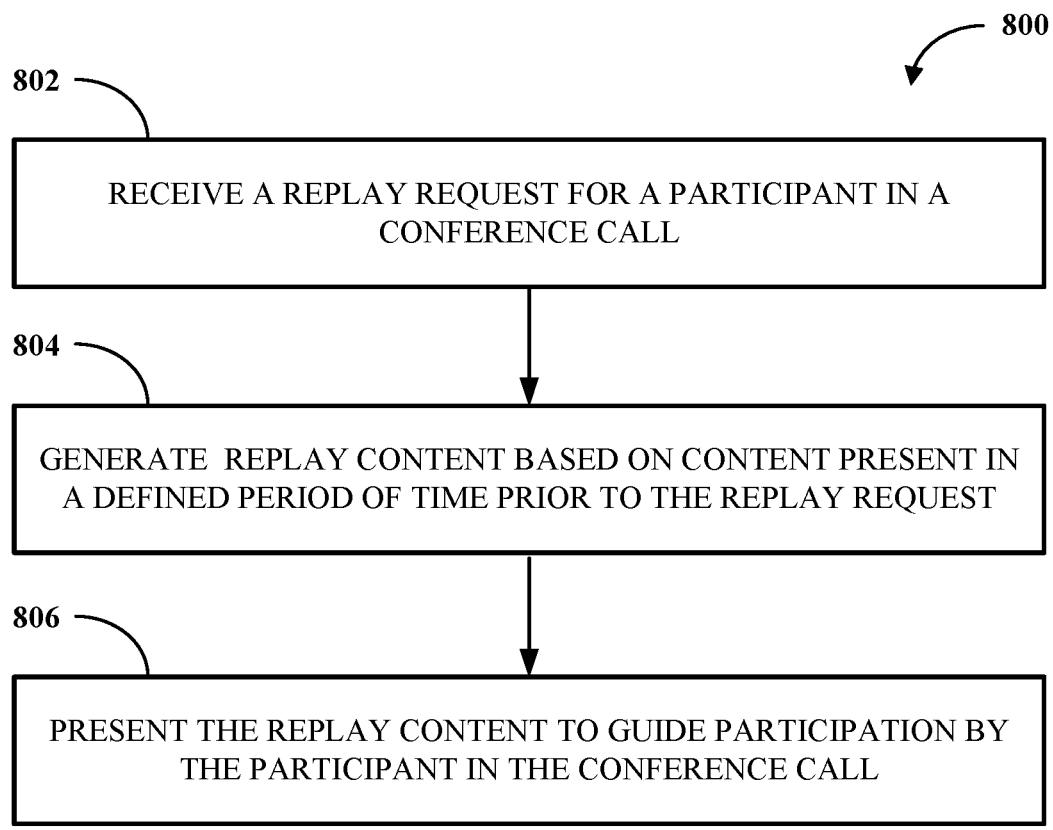
FIG. 8 is a flowchart of an example of a technique for providing content replay services.

To further describe some implementations in greater detail, reference is next made to examples of techniques which may be performed by or using a system for content replaying. FIG. 8 is a flowchart of an example of a technique 800 for a conference. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a replay request is received to replay content. The replay request can be conference participant initiated, other participant initiated, automatically initiated by software (e.g., event driven), initiated by a non-participating party, and/or combinations thereof. For example, where the replay request is initiated by the conference participant, the conference participant may interact with a user interface element to cause the replay request to be received based on the conference participant being distracted, not understanding a question, and/or having lost track of content or context. In another example, where the replay request is automatically initiated by software, the software can detect a topic relevant to the participant or a name of the participant as described herein. In a further example, a non-participating party can have access to the content replay software but is not involved in the conference session. For example, the non-participating party may be a delegate of a participant.

At 804, replay content is generated based on content present in a period of time associated with the replay request. The content on which the generation of the replay content is based may be obtained from a buffer. For example, that content may be stored in a buffer based on a moving window of time during the conference in which content corresponding to a timestamp which is outside the window of time may be purged from the buffer, such as to prevent outdated content from being improperly used for replay content generation. The content on which the generation of the replay content is based may include audio and/or video. The content can be transcribed. For example, a real-time transcription of the audio content can be obtained. Obtaining the real-time transcription may include generating the real-time transcription. Alternatively, obtaining the real-time transcription may include obtaining the real-time transcription from a software aspect which generates it. The real-time transcription is generated in real-time with a conversation occurring within a conference attended by multiple participants including a conference participant. The content is annotated using one or more annotation inputs or sources including communication services running on a device associated with the conference participant, or input from other participants with respect to the conference participant. For example, annotation may include evaluating the real-time transcription of the content using a contextual machine learning model to identify a request associated with a name of the conference participant or a topic relevant to the conference participant. The topic may be determined to be relevant to the conference participant based on conference participant characteristics, mannerisms, and/or on one or more historical communication records associated with the conference participant. The one or more historical communication records may, for example, correspond to one or more of a chat message, an instant message, a text message, an email, a call transcript, or a conference transcript. In another example, the topic is determined to be relevant to the conference participant based on one or more of organizational chart information or profile information associated with the conference participant. In another example, annotation may include summarizing the content, annotating the summary, highlighting, using content from communication services, or combinations thereof.

At 806, the replay content is presented to the conference participant of the conference. For example, presenting the replay content to the conference participant can include outputting the replay content in one or more determined formats to one or more output devices of a device associated with the conference participant. In one particular non-limiting example, the replay content can be in a text format and output within a client application running at the device associated with the conference participant. To present the replay content, configuration information associated with a device of the conference participant is obtained. The configuration information associated with the device of the conference participant includes configurations associated with the device of the conference participant. For example, the configurations may refer to audio output device settings, video output device settings, view selection, usage or environment settings or combinations thereof. The configuration information is used to determine how the replay content is presented, where the replay content is presented, to whom the replay content is presented, or combinations thereof. The replay content is output in accordance with the determinations for presentation to the conference participant. In some implementations, presenting the output to the conference participant may include causing a secondary device associated with the conference participant to present the output. In some such implementations, the secondary device may be identified as part of the process for presenting the replay content. The secondary device may be a mobile device or a wearable device.

Some implementations may include a method that includes receiving a replay request for a participant in a conference. The method may include generating replay content based on content from a period of time associated with the replay request. The method may include presenting the replay content by a client device associated with the participant of the conference. In one or more implementations, the replay request is sent by the client device, by a participant-contextual machine learning model, by a device associated with a non-participating party, or by another client device associated with another participant. In one or more implementations, the replay content is presented in at least one of an audio format or a visual format. In one or more implementations, the method may include annotating the content using one or more annotation inputs to guide the participant. In one or more implementations, the method may include annotating the content using at least one of keyword annotation, participant-contextual machine learning model based annotation, messaging based annotation, or other participant based annotation to guide the participant. In one or more implementations, the method may include annotating the content using messages present in a chat panel to guide the participant. In one or more implementations, the method may include annotating the content using messages or prompts from other client devices associated with other participants which are sent to guide the participant. In one or more implementations, the presentation of the replay content is kept separate from a recording of the conference. In one or more implementations, the method may include determining use of headphones or speakers at the client device. The presented replay content is filtered out from an input stream detected by a microphone at the client device. In one or more implementations, the method may include determining the participant is sharing a screen at the client device. The replay content is presented to the participant while being imperceptible to other participants. In one or more implementations, the client device is a secondary client device and conference content is presented on a primary client device associated with the participant. In one or more implementations, the replay request is automatically generated in response to detecting that the participant is inattentive with respect to the conference. In one or more implementations, a length of the replay content is automatically configurable by the participant.

In some implementations, an apparatus may include a memory and a processor. The processor is configured to execute instructions stored in the memory to receive a replay request for a participant in a conference, generate replay content based on content from a period of time associated with the replay request, and present the replay content by a client device associated with the participant of the conference. In one or more implementations, the processor may be configured to determine an optimum location on a display of the client device to present the replay content for usage by the participant. In one or more implementations, the processor may be configured to use output of a contextual machine learning model that evaluates content of real-time transcription of the conference to detect an event relevant to the participant. In one or more implementations, the processor may be configured to annotate the content to include topics for discussion by the participant. In one or more implementations, the processor may be configured to maintain the replay content and annotations separate from a recording of the conference.

Some implementations may include a non-transitory computer-readable storage device that includes program instructions. The program instructions may be executed by a processor that cause the processor to perform operations. The operations may include receiving a replay request for a participant in a conference, generating replay content based on content from a period of time associated with the replay request, and presenting the replay content by a client device associated with the participant in the conference. In one or more implementations, the operations may include annotating the reply content by one or more of highlighting keywords, including input from other participants, and summarizing the content. In one or more implementations, the operations may include providing a replay content notification to the participant when the replay content is available for usage by the participant.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   receiving, during a conference, a replay request for a participant in the conference;
   responsive to the replay request, generating replay content based on content from a period of time associated with the replay request,
      wherein the generating replay content comprising:
         automatically identifying context relevant to the participant in contrast to other topics present in the content that is not relevant to the participant, such that context relevant to the participant is different from context relevant to other participants; and
         automatically annotating the content to highlight the identified context relevant to the participant; and
   presenting, during the conference, the replay content by a client device associated with the participant of the conference.

2. The method of claim 1, wherein the replay request is sent by a participant-contextual machine learning model, by a device associated with a non-participating party, or by another client device associated with another participant.

3. The method of claim 1, wherein the replay content is presented in at least one of an audio format or a visual format.

4. The method of claim 1, further comprising:
   annotating the content using one or more annotation inputs to guide the participant.

5. The method of claim 1, further comprising:
   annotating the content using at least one of keyword annotation, participant-contextual machine learning model based annotation, messaging based annotation, or other participant based annotation to guide the participant.

6. The method of claim 1, further comprising:
   annotating the content using messages present in a chat panel to guide the participant.

7. The method of claim 1, further comprising:
   annotating the content using messages or prompts from other client devices associated with other participants which are sent to guide the participant.

8. The method of claim 1, wherein storage of the replay content is kept separate from a recording of the conference by placing a tag to identify the replay content.

9. The method of claim 1, wherein the client device is a secondary client device and conference content is presented on a primary client device associated with the participant.

10. The method of claim 1, further comprising:
    determining the participant is sharing a screen at the client device; and
    presenting the replay content to the participant while being imperceptible to other participants.

11. The method of claim 9, further comprising:
    determining use of headphones or speakers at the client device; and
    filtering out presented replay content from an input stream detected by a microphone at the client device.

12. The method of claim 1, wherein the replay request is automatically generated in response to detecting that the participant is inattentive with respect to the conference, and wherein the inattentiveness is determined from reviewing at least one of image data, audio data, real-time transcription, or settings of the client device as related to an attentiveness of the participant.

13. The method of claim 1, wherein a length of the replay content is automatically configurable by the participant.

14. An apparatus, comprising:
    a memory; and
    a processor configured to execute instructions stored in the memory to:
       receive, during a conference, a replay request for a participant in the conference;
       responsive to the replay request, generate replay content based on content from a period of time associated with the replay request,
          wherein for the generate, the processor is configured to execute the instructions to:
             automatically identify context relevant to the participant in contrast to other topics present in the content that is not relevant to the participant, such that context relevant to the participant is different from context relevant to other participants; and automatically annotate the content to highlight the identified context relevant to the participant; and present, during a conference, the replay content by a client device associated with the participant of the conference.

15. The apparatus of claim 14, wherein the processor is configured to execute the instructions to:

determine an optimum location on a display of the client device to present the replay content for usage by the participant.

16. The apparatus of claim 14, wherein the processor is configured to execute the instructions to:

use output of a contextual machine learning model that evaluates content of real-time transcription of the conference to detect an event relevant to the participant.

17. The apparatus of claim 14, wherein the processor is configured to execute the instructions to:

annotate the content to include topics for discussion by the participant; and maintain the replay content and annotations separate from a recording of the conference.

18. A non-transitory computer readable medium storing instructions operable to cause one or more processors to perform operations comprising:

receiving, during a conference, a replay request for a participant in the conference;

responsive to the replay request, generating replay content based on content from a period of time associated with the replay request, wherein the generating replay content comprising:

automatically identifying context relevant to the participant in contrast to other topics present in the content that is not relevant to the participant, such that context relevant to the participant is different from context relevant to other participants; and automatically annotating the content to highlight the identified context relevant to the participant; and presenting, during a conference, the replay content by a client device associated with the participant in the conference.

19. The non-transitory computer readable medium of claim 18, wherein the processor is configured to execute the instructions to perform operations comprising:

annotating the reply content by one or more of highlighting keywords, including input from other participants, and summarizing the content.

20. The non-transitory computer readable medium of claim 18, wherein the processor is configured to execute the instructions to perform operations comprising:

providing a replay content notification to the participant when the replay content is available for usage by the participant.

* * * * *